United States Patent [19]

Miller et al.

[11] Patent Number: 5,835,768

[45] Date of Patent: Nov. 10, 1998

[54] COMPUTER OPERATING SYSTEM PROVIDING MEANS FOR FORMATTING INFORMATION IN ACCORDANCE WITH SPECIFIED CULTURAL PREFERENCES

[75] Inventors: Gary Wayne Miller, Leander, Tex.; Danial A. Rose, Markham, Canada; Robert Milton Smith, Morgan Hill, Calif.; Baldev S. Soor, Markham, Canada; Luis C. Tan, Morgan Hill, Calif.; G. David A. Weston, Toronto, Canada

[73] Assignee: International Business Machines Corporation, Armonk, N.Y.

[21] Appl. No.: 598,761

[22] Filed: Feb. 8, 1996

[30] Foreign Application Priority Data

Mar. 30, 1995 [CA] Canada .................................. 2145923

[51] Int. Cl.⁶ ...................................................... G06F 9/40
[52] U.S. Cl. ........................................... 395/682; 345/333
[58] Field of Search .................................... 395/680, 333, 395/682; 345/333

[56] References Cited

U.S. PATENT DOCUMENTS

| | | | |
|---|---|---|---|
| 4,595,980 | 6/1986 | Innes ....................................... | 395/758 |
| 5,513,342 | 4/1996 | Leong et al. ............................ | 395/157 |
| 5,572,668 | 11/1996 | See et al. ............................. | 395/183.14 |

OTHER PUBLICATIONS

Dale, Nell, Susan C. Lilly, "Pascal Plus Data Structures, Algorithms, and Advanced Programming," D.C. Heath & Company, pp. 139–141, 1988.

Plauger, P.J., "Inserters," C/C++Users Journal, v12, n10, p. 10(5), Oct. 1994.

Kano, Nadine; Freytag Asmus, "Internationalizing your Win32–based applications for Windows NT and Windows 95,–" Microsoft Systems Journal, v9 n12 p. 49(11), Dec. 1994.

Allison, Chuck, "The standard C++library," C/C++Users Journal, v12, n12, p. 69(12), Dec. 1994.

*Primary Examiner*—Majid A. Banankhan
*Assistant Examiner*—St. John Courtenay, III

[57] ABSTRACT

A system is disclosed for presenting information which reflects the users' cultural preference, including language and other conventions, that can manage locale categories without requiring application programs to manage all the overhead of repetitive changes to locale category values. Users merely specify their cultural preferences through the application programs and the operating system assigns a stack from the working memory for each specified category of cultural preference, and pushes onto the stack the location in the working memory of a file for the category of cultural preference specified, the file having been transferred from a locale database of files that contain code for formatting according to the cultural preferences. In a second aspect of the operating system, multiple concurrent sets of cultural preferences are handled by determining whether a location in the working memory corresponding to the preference specified is currently in the queue, and if not, by placing a new value in the queue for each memory location corresponding to an additional set of locale category values.

3 Claims, 8 Drawing Sheets

PRIOR ART

| Locale | Locale Category | Locale Category Handle |
|---|---|---|
| 1 | LC_Collate | K |
| 1 | LC_Ctype | M |
| 1 | LC_Monetary | T |
| 1 | LC_Numeric | U |
| 1 | LC_Time | C |
| 1 | LC_Messages | F |
| 2 | LC_Collate | J |
| 2 | LC_Ctype | P |
| 2 | LC_Monetary | D |
| 2 | LC_Numeric | H |
| 2 | LC_Time | W |
| 2 | LC_Messages | Q |
| 3 | LC_Collate | G |
| . | . | . |

245 brackets the first locale (rows 1–6); 250 brackets the second locale (rows 7–12); 255 brackets the third locale; 258 brackets all columns.

COMPUTER OPERATING SYSTEM PROVIDING MEANS FOR FORMATTING INFORMATION IN ACCORDANCE WITH SPECIFIED CULTURAL PREFERENCES

BACKGROUND OF THE INVENTION

In order for an application program to be practically useful it must be capable of presenting information which reflects the users' cultural preferences (language and conventions) and allow users to interact with the application according to their cultural preference. Typically, the cultural preference of an application program is customized for a specific market (geographical region or country). Application programs are relatively inflexible in allowing users to alter the application's cultural preference to their particular needs. Therefore, in order to market an application program internationally, significant expense may be incurred in customizing the application program for each individual international market and providing technical support and updates. The customization of application programs also limits the users' ability to incorporate characteristics of more than one culture.

An internationalized application program has no built-in assumptions with respect to the cultural preference of its users or the data it is to process or present. Rather, it allows the user to specify the language or conventions of the information used to interact with the application and the language or conventions in which the information is presented by the application.

The establishment of ISO/IEC 9945-1:1990 (IEEE Standard 1003.2-1990) Information Technology-Portable Operating System Interface (POSIX™) Shell and Utilities provided a vehicle for the development of portable applications. IEEE Standard 1003.1 describes a set of basic system services for input/output, file system access, and process management to be used in the development of application programs. The standard also defines an interface accessible from the C programming language, which provides access to these services and establishes standard semantics and syntax. This interface allows application program developers to write portable applications in the C programming language.

In compliance with IEEE Standard 1003.1, IEEE Standard 1003.2 was developed to facilitate the internationalization of applications which did not require the application program developer to customize the application program for each cultural market. IEEE Standard 1003.2 defines a source code level interface to shell services and common utilities which is independent of IEEE Standard 1003.1. An extension of this standard is the User Portability Extension (UPE) (IEEE Standard 1003.2a) that addresses interactive terminal-oriented utilities such as full screen editors.

The IEEE Standards 1003.2 and 1003.2a are based on a "locale" model which provides the binding methodology for combining user preferences for language and conventions with the functions of the internationalized application program at run-time. The locale model describes the user's language or conventions to the application program and conveys it to the application program at run-time so that the data is processed and presented correctly according to the needs of the user.

The locale model defines six categories of cultural variables, which are collectively referred to as "locale categories": (1) character collation; (2) character attributes and mappings; (3) monetary formatting; (4) numeric data formatting; (5) date and time formatting; and (6) messages. The user of the application program specifies values to each of the locale categories which particularizes the type of formatting to be applied to the data to be processed or presented. For example, possible values for the locale category "monetary formatting" would be United States (dollar), German (deutsche mark), France (franc), etc. which would result in the monetary data being formatted to be processed or presented according to the currency of the specified country (i.e. "value"). When the six locale categories are assigned specific values, they are collectively referred to as a "locale". The locale categories are referenced by the application program as the application program is executed. The implementation of the locale model is described in more detail below under the heading "Detailed Description of the Preferred Embodiments."

The locale model as presently implemented has several limitations and drawbacks. One drawback relates to the management of the values specified for the locale categories. Users of an internationalized application program will often change the value of a locale category in the course of using the application program. When using a multi-threaded application program users may require that the value of a locale category be changed repeatedly between a group of several values. The term "thread" refers to a basic unit of execution that is logically independent from another part of the program and can therefore be executed in parallel with other threads of the program.

Presently, when a change is made to the value of one or more locale categories, the change is accomplished by the application program initiating a system call which results in the existing value or values being replaced at the process level. As used herein, the term "process" refers to the representation of the executable form of a program. The executable form or the process of a multi-threaded program consists of a number of independent threads which can be executed in parallel. A thread may be executed concurrently with another thread or may create or invoke another process. In multi-threaded application programs the responsibility for managing previous locale category values is left with the application program. In order to manage previous locale category values the application program must perform the following steps when the value of a locale category is to be changed: issue a system call to examine the current value of the locale category that is requested to be changed; if the current locale value is different from the desired locale value, write the present locale value to a memory location; and issue a system call to replace the locale category value with the desired new value. The terms "system call" and "function call" are used interchangeably herein.

This technique for managing preceding locale category values places additional burden on the application program developer, requires significant memory allocation by the application program and requires significant processing overhead.

A second limitation or drawback relates to the execution of multi-threaded programs. Often it is desirable for the users of multi-threaded applications to be able to vary the cultural sensitivity of the threads within a superprocess. A "superprocess" is defined as a representation of all the processes a central processing unit (CPU) is responsible for managing at a point in time. The term "superprocess" indicates that a CPU may be required to share its resources amongst several processes. Application programs which are sensitive to the user's cultural preferences are currently unable to support more than one culture at a time within a superprocess. Therefore, when any of the locale categories are changed, the change occurs globally for that superprocess. This is referred to as a global locale model.

Presently the global locale model does not allow concurrent activation of several different locales within one application. Also, it is quite cumbersome for the user to selectively modify subcomponents of the globally stated cultural preference from within the application program code. If the locale is changed, it is changed globally for that superprocess. This requires multiple copies of sometimes large locale definition information to be created, maintained and manipulated by the application program.

SUMMARY OF THE INVENTION

The present invention relates to an operating system, in a computer readable format, for configuring a computer to enable users to execute application programs on the computer. The application programs permit the users to specify the cultural preference for formatting information to be presented by the users or for processing information provided to the users. The computer includes working memory and a database of files, managed by the operating system. The files in the database contain code for formatting the information according to the specified cultural preference. The operating system transfers one or more of the files, corresponding to said specified cultural preference, from the database to the working memory. The operating system includes means for setting environment control variables corresponding to categories of cultural preferences that may be specified, means for implementing a function call, and means for populating each of the memory locations corresponding to the categories of cultural preference. The function call is accessible by the application programs, wherein the function call:

assigns from the working memory, one stack for each category of cultural preference that may be specified; and pushes onto each assigned stack, the location in the working memory of the transferred file for the category of cultural preference specified.

The invention also provides an operating system, in a computer readable format, for configuring a computer to enable users to execute application programs on the computer. The application programs permit the users to specify the cultural preference for formatting information to be presented by the users or for processing information provided to the users. The application program is executable as a number of processes, each of which may support one or more threads. The computer includes working memory and a database of files, managed by the operating system. The files contain code for formatting the information according to the specified cultural preference. The operating system transfers one or more of the files, corresponding to said specified cultural preference, from the database to the working memory. The operating system includes means for setting environment control variables corresponding to cultural preferences that may be specified, and a means for implementing a function call. The function call is accessible by each of the processes, wherein the function call:

assigns from the working memory, for each of the processes from which the function call is executed, one stack for each category of cultural preference that may be specified; and pushes onto each assigned stack, the location in the working memory of the transferred file corresponding to the cultural preference specified.

The invention still further provides on a subsequent function call, that the application:

determines whether or not the location in the working memory of the transferred file, corresponding to the cultural preference specified, is on the stack previously assigned by a function call to the category of cultural preferences specified;

if so, invokes a function call that pops the previously assigned stack until the location in memory is on the top of the previously assigned stack; and if not, invokes a function call that pushes onto each previously assigned stack, the location in the working memory of the transferred file for the category of cultural preference corresponding to said previously assigned stack.

In another aspect, the present invention provides an operating system wherein the function call also:

assigns from the working memory, a queue; and loads on the queue, said location in the working memory of the transferred file, corresponding to the cultural preference specified for the category of cultural preference, along with a corresponding cultural preference identifier.

In a further aspect, the present invention provides an operating system further comprising means for implementing a second function call, wherein the second function call:

determines whether or not a cultural preference identifier is on the queue;

if so, retrieves from the queue the corresponding memory locations and populates each of the memory locations corresponding to the category of cultural preference; and if not, transfers to the working memory a file, corresponding to each category of cultural preference specified, and pushes onto each assigned stack, the location in the working memory of the transferred file for the category of cultural preferences specified.

BRIEF DESCRIPTION OF THE DRAWINGS

The present invention will be further understood from the following description with reference to the drawings in which.

Similar references are used in different figures to denote similar components.

DETAILED DESCRIPTION OF THE PREFERRED EMBODIMENTS

In order to facilitate understanding of the invention, the prior art global locale model will first be described with reference to FIGS. 1–3.

A brief description of the function of each of the environment control variables follows:

LC_COLLATE—specifies the character collation or ordering sequence.
LC_CTYPE—specifies the character attributes and mappings.
LC_MONETARY—specifies the monetary formatting.
LC_NUMERIC—specifies the numeric data formatting.
LC_TIME—specifies the date and time formatting.
LC_MESSAGES—specifies the affirmative and negative expressions and language to be used in communication with the user.

Figure 1:
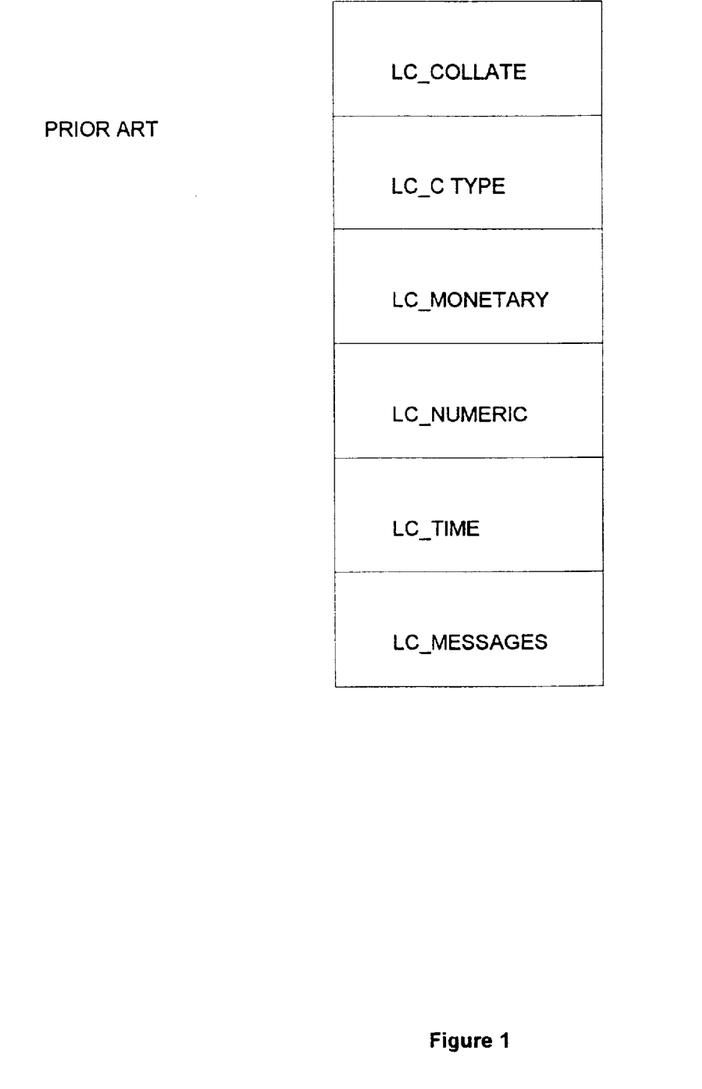
FIG. 1 illustrates the locale categories in the prior art locale model.

FIG. 1 illustrates the six locale categories which are collectively referred to as a "locale". Once the locale has been initialized the internationalized application program refers to the value of the locale categories as the application program is executed. The values of the locale categories at any point in time represents an instantiation of the user's localized information or preference.

Figure 2:
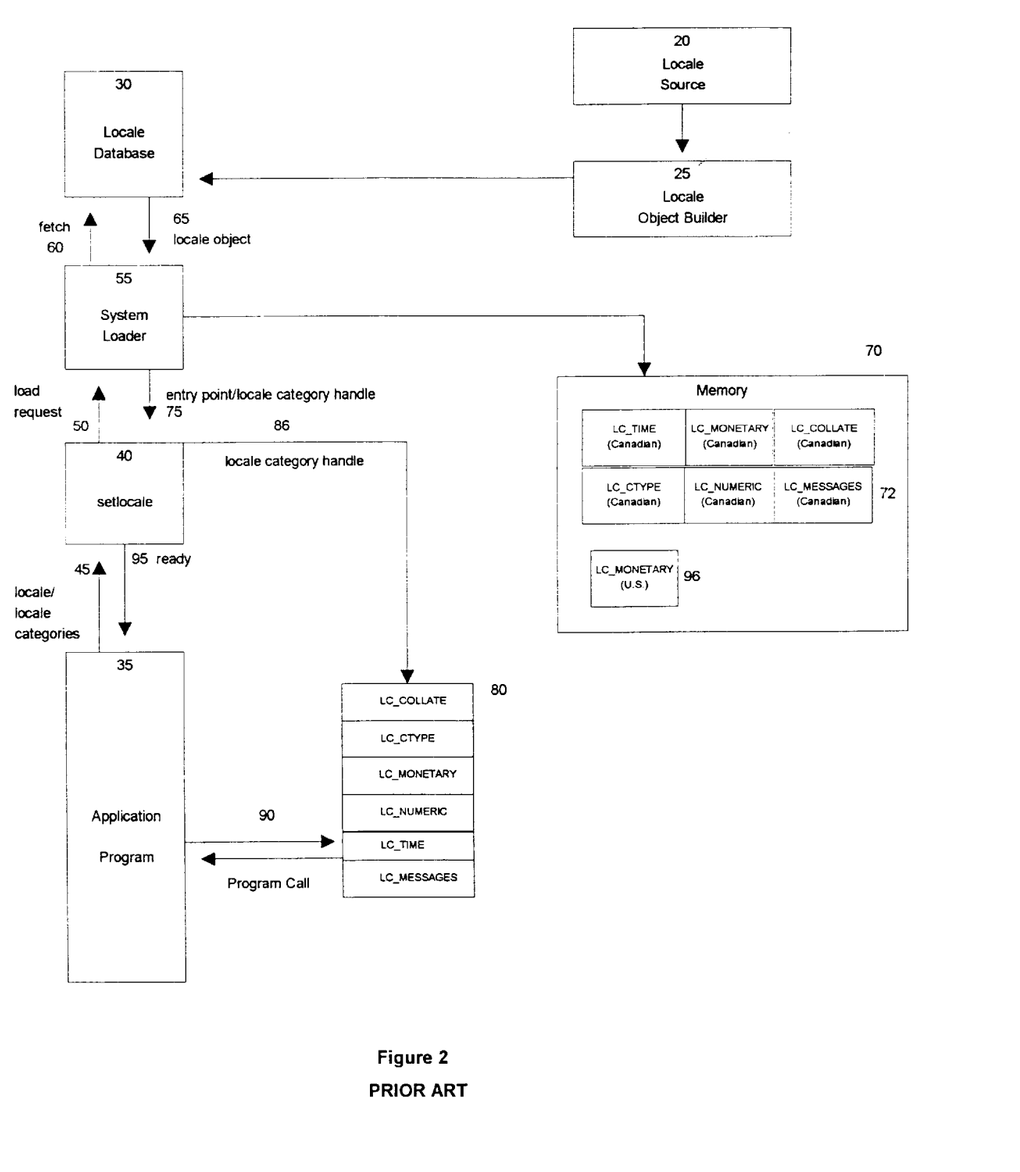
FIG. 2, in a block diagram, illustrates the operation of the prior art global locale model as presently used in internationalized applications.

FIG. 2, in a block diagram, illustrates the operation of the prior art global locale model presently used in C programming language applications internationalized according to IEEE Standards 1003.2 and 1003.2a. FIG. 2 diagrammatically shows the relevant portions of a computer and operating system used to implement the prior art global locale model. FIG. 2 shows portions of the operating system, working memory, locale database, application program interface and file management. The locale mechanism provides a means for conveying the user's language or convention preferences to the application at run-time.

Referring to FIG. 2, locale source 20 is a library of files each containing the source code required to implement a locale available for selection by the user. Each source code file contains the source code for each of the six locale categories, which uniquely define a set of cultural and linguistic standards or preferences. The locale source 20 may be viewed and edited by the user. Each file in the library is identified by a unique identifier, the locale name, that is used as a reference for the localization information contained in the locale source 20. For example, a locale named "Canada" may contain source code which enables the application program to present information or interact with the user, according to Canadian cultural standards.

The locale source is then compiled by a locale object builder 25 creating a system specific formatted locale object from the locale source 20. IEEE Standard 1003.2 defines the "localedef" utility that generates a locale object from locale source 20. The object code is stored in a permanent database, referred to as locale database 30.

When the user establishes or changes a locale, the application program 35 initiates a function call to a system service, referred to as set locale 40. Set locale 40 is used to provide programmable control over the cultural preference processing environment. The application program passes the name of the user's specified locale (arrow 45) to set locale 40. Set locale 40 then initiates a load request (arrow 50) to a system loader program 55. The system loader 55 initiates a fetch call (arrow 60) which locates the object file corresponding to the specified locale in the locale database 30. The system loader 55 then retrieves the locale object file (arrow 65) and loads it into memory 70 which is allocated from the working memory of the computer. The locale object file loaded into memory 70 is identified by numeral 72.

The system loader 55 transfers the memory location ("entry point") (arrow 75) of the loaded object file to set locale 40. This entry point allows set locale 40 to assign a handle ("locale category handle") to the object code for each of the locale categories within the loaded locale object file. A locale category handle is a pointer, i.e. memory location, determined by the locale entry point and the relative position of the locale category's object within the locale object in memory 70. The locale category handle is not exposed on the application programming interface. Set locale 40 then assigns the locale category handles (arrow 86) for the specified locale to the locale categories 80. The locale information is readily accessible to the application program via a program call 90 to the appropriate locale category 80. Set locale 40 informs the application program 35 by a message (arrow 95) that the desired locale is available.

Once a locale has been selected or the default locale values have been inherited, a user may modify the individual value of any of the locale categories which is then changed globally at the superprocess level. If the user specifies a different value for a locale category, for example U.S. for LC_MONETARY, a system call (arrow 45) is initiated to set locale 40. Setlocale 40 then initiates a load request (arrow 50) to the system loader program 55. The system loader 55 initiates a fetch call (arrow 60) which locates the file corresponding to the specified locale category in the locale database 30, retrieves the object file for the specified locale category (arrow 65) and loads it into memory 70. In FIG. 2, the object file for LC_MONETARY (U.S.) is identified by numeral 96 in memory 70, which now replaces the LC_MONETARY (Canadian) category identified by numeral 72. The system loader 55 communicates the memory location (arrow 75), i.e. locale category handle, of the newly loaded object file to set locale 40, deleting and replacing the memory location for LC_MONETARY (Canadian). Set locale 40 then assigns the category handle (arrow 86) of the specified locale to the corresponding locale category.

The application program is not required or able to manage the environment settings and must rely on set locale 40 to perform those functions. The application program is only required to call setlocale 40.

In operation, when initiating a program call requiring the presentation of data or the processing of data provided by the user, the data to be presented or processed are first located. The value of the relevant locale category is then determined. The pointer to the appropriate locale object file in memory 70 is obtained as known by the person skilled in the art. The function applies the formatting rules specified in the locale category object. The formatted data are then presented or processed.

The setting of the locale categories by the set locale system service is global at the superprocess level. All threads and processes under a superprocess use the same locale setting.

Figure 3:
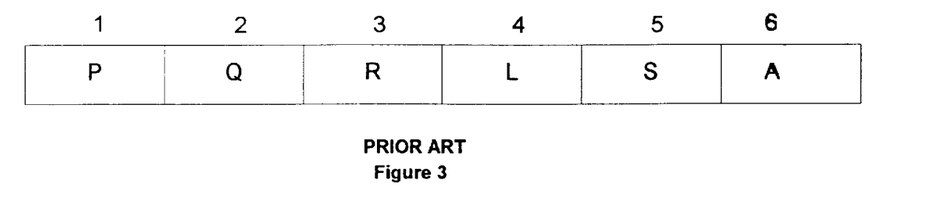
FIG. 3 illustrates the prior art handling of the values of the locale categories in the global locale model.

FIG. 3 illustrates the prior art handling of the values of the locale categories in the global locale model. The numbers represent the different categories of the locale and the letters represent particular values for these categories. Any value may be changed but all changes are accomplished by replacement of an existing value. If a previous value is required to be restored after a change, it must be first saved. The prior art describes no specific system function to do a save and restore operation. In order to provide for the restoration of a previous value the application must perform the necessary steps which include: issuing a system call to examine the current value of the locale category that is requested to be changed; determining if the current locale value is different from the desired locale value, writing the present locale value to a memory location; and issuing a system call to replace the locale category value with the desired new value.

Figure 4:
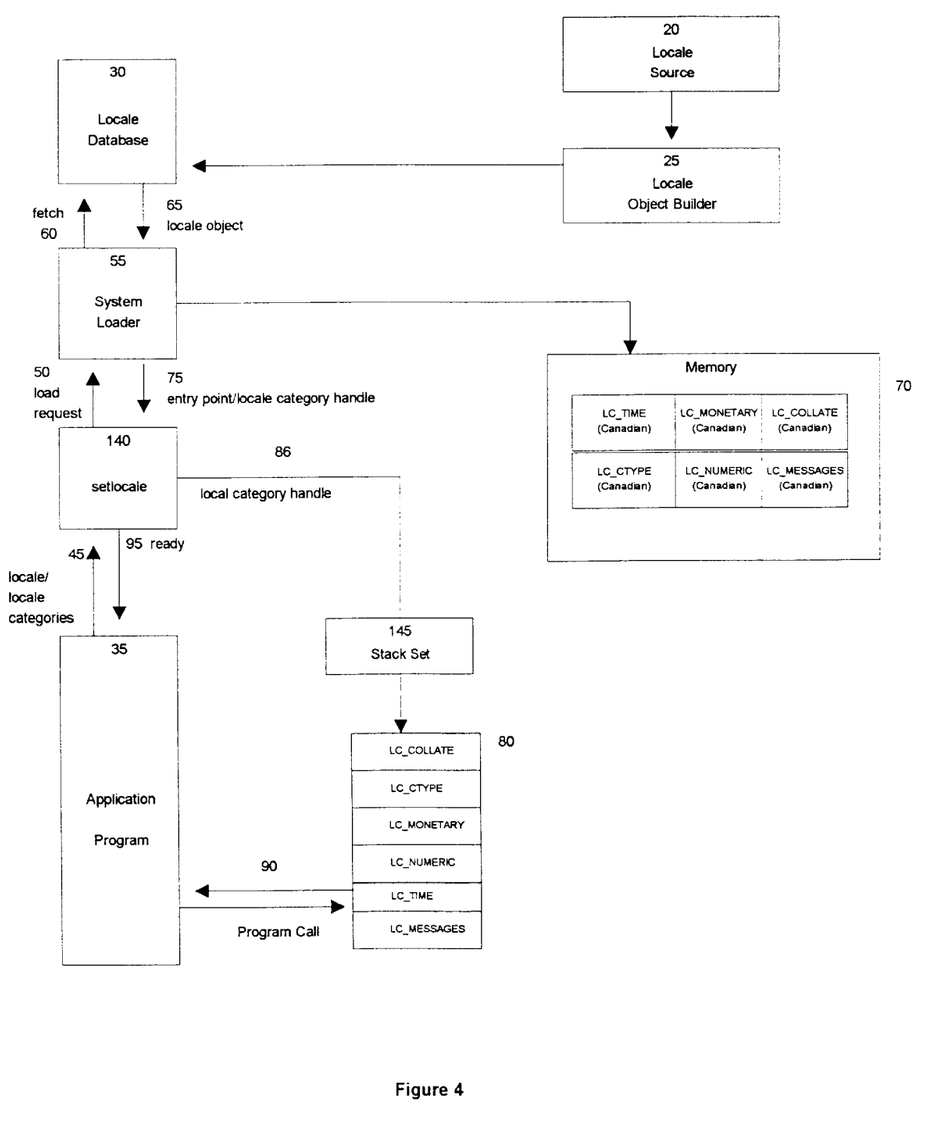
FIG. 4 in a block diagram, illustrates the operation of the stack based global locale model as implemented in a preferred embodiment of the invention.
Figure 5A:
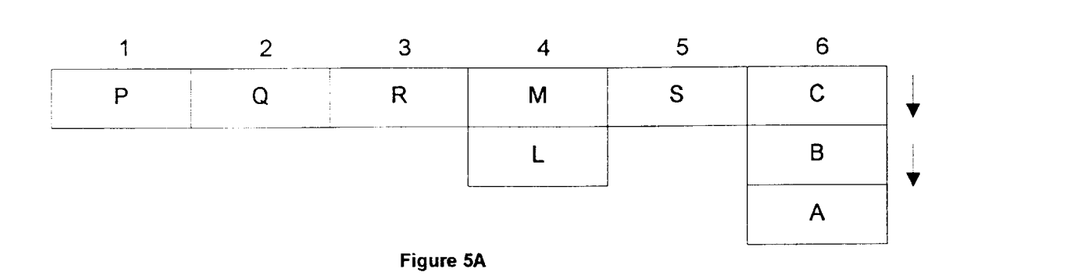
FIG. 5A illustrates the handling of the values of the locale categories in the stack based global locale model as implemented in a preferred embodiment of the invention.
Figure 5B:
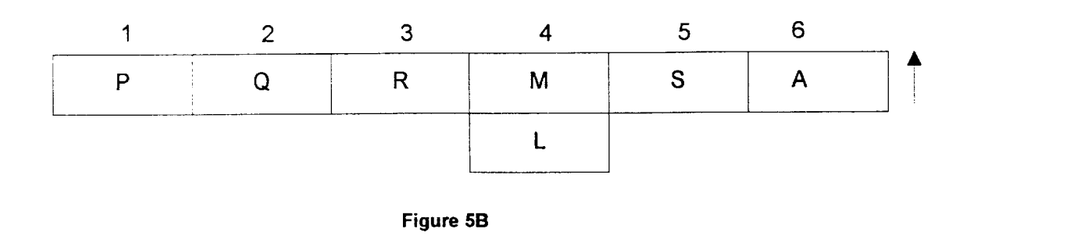
FIG. 5B illustrates the values of the locale categories in FIG. 5A after the application program has restored value "A" to locale category 6.
Figure 6:
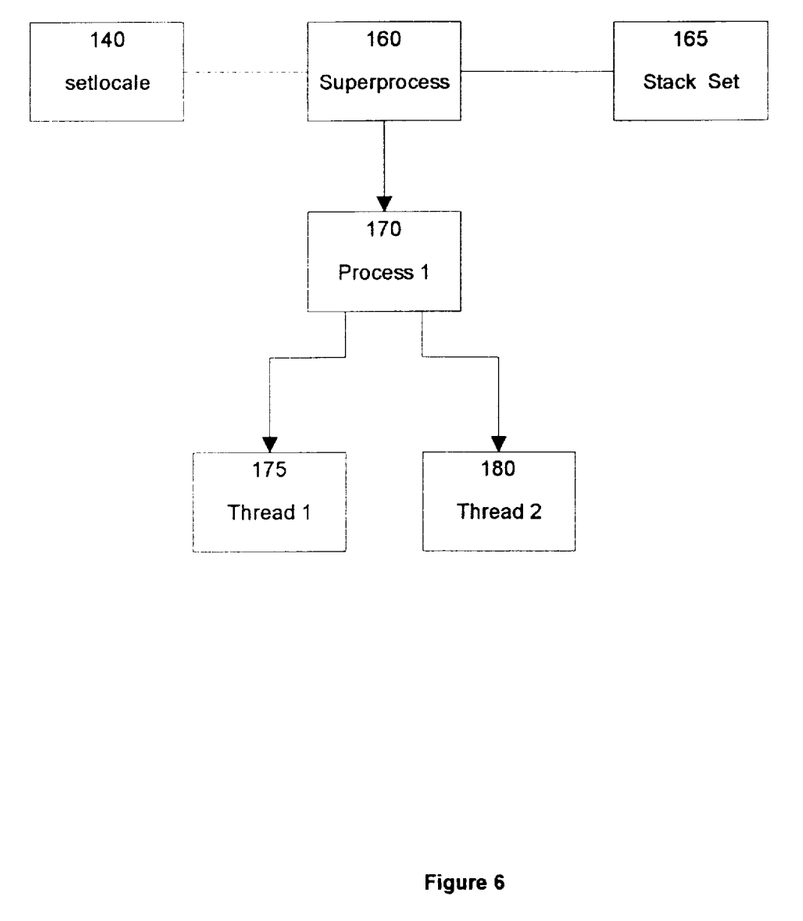
FIG. 6, in a block diagram, illustrates the relationship between processes, threads and stack sets in a stack based global locale model as implemented in a preferred embodiment of the invention.

Reference will now be made to FIGS. 4–6 in order to describe a stack based global locale model in accordance with a first embodiment of the invention. In FIG. 4, a block diagram illustrating the operation of the stack based global locale model as implemented in a first embodiment of the invention is shown.

Use is made of a system-controlled last-in-first-out (LIFO) stack to provide an efficient save/restore mechanism. The locale category handles are maintained in separate system-controlled stacks at the superprocess level. A set of six stacks is assigned from the computer's working memory to a superprocess implementing the control of cultural preferences. Each of the six stacks corresponds to one of the six locale categories 80. The set of six stacks is referred to as a "stack set". When an initial locale is specified by the application or user, set locale 140 obtains the entry point and initiates a system PUSH operation which places the new locale category handles on the stack set 145. The locale category handles of the stack set represent the locale categories 80.

In an application 35, when new locale category values are required, set locale 140 is called and places the new locale category handles on the stack set assigned to the process, pushing the previous handles down the stack set. The locale category handles on the top of the stack set represent the appropriate locale categories 80.

FIG. 5A illustrates the handling of values of the locale categories in a preferred embodiment of the invention by making use of system controlled stacks. Again, the numbers represent the different categories of the locale and the letters represent values specified for the categories. For example, in FIG. 5A, the stack in the stack set representing locale category "6" was initially specified with the value "A" by the user. The user subsequently changed the value of locale category "6" to "B" and then to "C". As shown in FIG. 5B, when value "A" is again specified for category "6", the stack is POPPED twice, removing values "C" and "B" and, thus, returning "A" to the top of the stack where it may be accessed.

FIG. 6 illustrates the relationship between superprocess, processes, threads and the stack set in the stack-based global locale model. In FIG. 6, superprocess (160) issues a call to set locale 140 to establish a locale. The locale category handles of the locale categories are pushed by setlocale 140 onto a stack set which is assigned to the superprocess (160) and is identified in FIG. 6 as the stack set (165). Thread 1 (175) and thread 2 (180) run directly under process 1 (160). When executing threads 1 (175) and 2 (180), the system utilizes the locale category handles identified in the stack set (165) as the active global locale. Changes may be made to the locale or locale categories by either thread 1 (175) or thread 2 (180). These changes are effective immediately at the superprocess level (160) and at the process level, i.e. process 1 (170), and affect all threads running under the superprocess.

Figure 7:
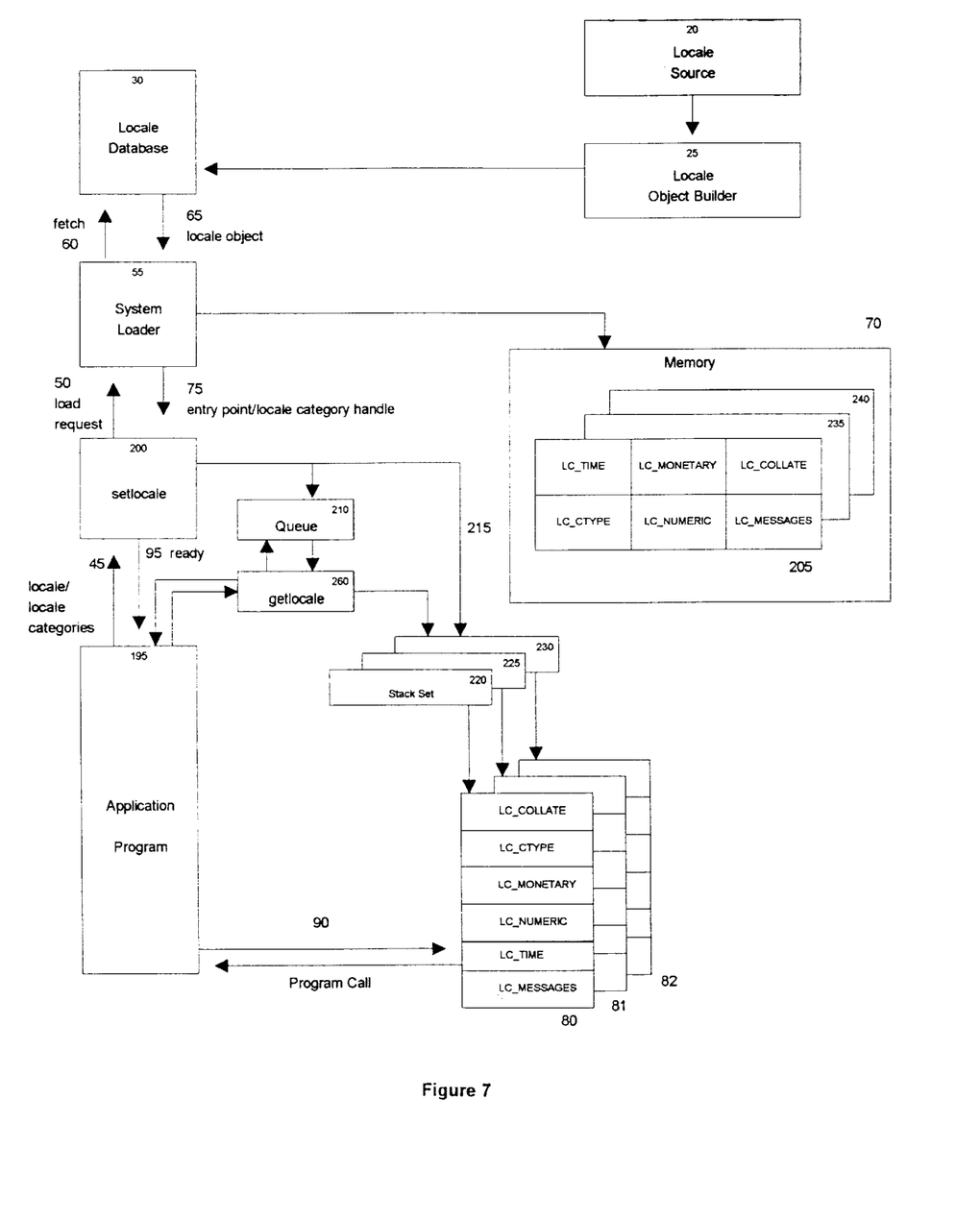
FIG. 7, in a block diagram, illustrates the operation of the stack based non-global locale model as implemented in a preferred embodiment of the invention.
Figure 8:
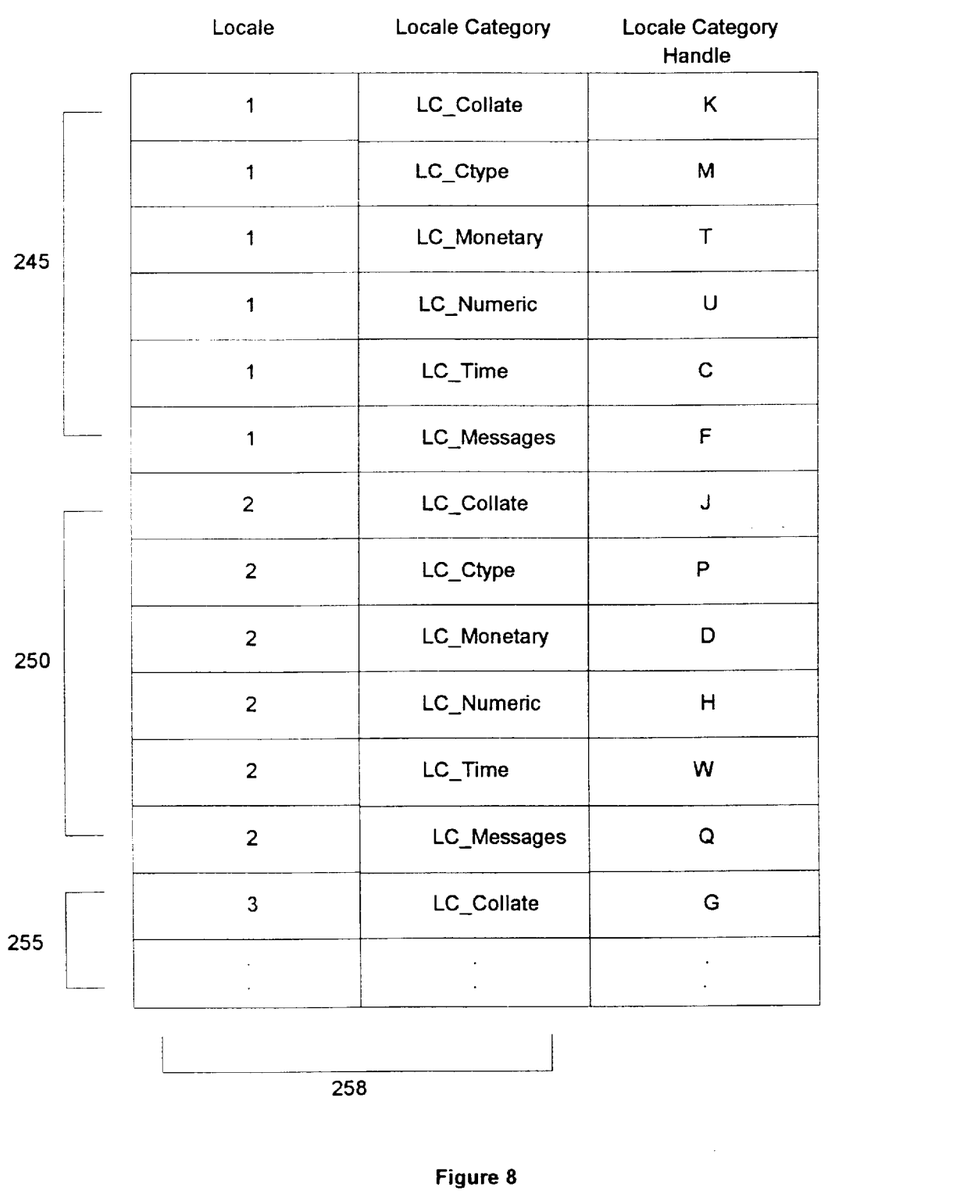
FIG. 8, illustrates conceptually the queue in the form of a look up table as implemented in the preferred embodiment of the invention in FIG. 7.

A further embodiment of the invention implementing a stack-based non-global locale model is described with reference to FIGS. 7–9. FIG. 7, in a block diagram, illustrates the operation of the non-global locale model as implemented in a second embodiment of the invention. Referring to FIG. 7, locale source 20 is compiled by a locale object builder 25 creating a system specific formatted locale object from the locale source 20. The object code is stored in a permanent database, referred to as the locale database 30.

When the user establishes or changes a locale, the application program 195 initiates a call to a system service referred to as set locale 200 and passes the name of the user's specified locale (arrow 45) to set locale 200. Set locale 200 then initiates a load request (arrow 50) to a system loader program 55. The system loader 55 initiates a fetch call (arrow 60) which locates the specified locale in the locale object database 30. The system loader 55 retrieves the locale object (arrow 65) and loads it into memory 70. The locale object loaded in the memory 70 is identified by numeral 205.

The system loader 55 communicates the memory location ("entry point") (arrow 75) of the loaded object file to set locale 200. The entry point allows set locale 200 to assign locale category handles within the loaded locale object file. Set locale 200 places locale category handles in a queue 210. The queue 210 can be, for example, a structure, an array, a linked list, a control block, a look-up table in memory or other mechanisms as will be understood by those skilled in the art. Setlocale 200 then populates (arrow 215) a stack set assigned to the process that initiated setlocale 200, with the locale category handles for the specified locale. In FIG. 7, three stack sets identified as 220, 225 and 230 are shown, corresponding to three locale categories 80, 81 and 82. The values on the stack set 220 that are populated by setlocale 200 are used to populate the locale categories 80. The locale information is readily accessible to the application program 195 via a program call 90. Setlocale 200 informs the application program 195 by a message 95 that the desired locale is available.

When a subsequent locale is specified by another process the same procedure is followed by setlocale 200 in storing the locale object in memory 70. In FIG. 7, two subsequent locale objects have been loaded in memory and are identified by numerals 235 and 240. However, the previous locale objects are preserved in memory 70. Therefore, the system environment must permit multiple locales to be in memory storage at the same time. Setlocale 200 adds the locale category handles for the locale objects 235 and 240 to the queue 210. FIG. 8 illustrates conceptually the queue 210 in the form of a look-up table. Locale objects in memory 70 identified by numerals 205, 235 and 240 are identified in FIG. 8 as locales 1 (245), 2 (250) and 3 (255), respectively. The locale category handles correspond to the location in memory 70 at which the corresponding locale category is located. A cultural preference identifier indicates the locale category handle for the locale category for a specific locale. In FIG. 8, the cultural preference identifier 258 would include the locale and locale category. It will be understood by those skilled in the art that the cultural preference identifier is not restricted to the form of the identifier 258 in FIG. 8.

Once a locale has been selected or the default locale values have been inherited, the user may modify the individual value of any of the locale categories which is then changed at the thread level. Once the user has specified a new value for a locale category, a system call (FIG. 7, arrow 45) is initiated to setlocale 200.

Setlocale 200 then initiates a load request (arrow 50) to the system loader program 55. The system loader 55 initiates a fetch call (arrow 60) which locates and retrieves the object for the specified locale category (arrow 65) in the locale database 30, and loads the object file into memory 70. The system loader 55 communicates (arrow 75) the memory location, i.e. locale category handle, of the loaded object file to setlocale 200. Setlocale 200 populates (arrow 215) the stack, corresponding to the locale category in the stack set 220, with the locale category handle. The locale category handle on the appropriate stack in the stack set 220 is used to populate the appropriate locale category 80.

The present invention also provides for the use of a system service identified as getlocale 260 which is initiated by the application program 195 in order to select any locale or locale category currently in memory 70. When called by the application program 195, getlocale 260 queries the queue 210 to determine whether or not the desired locale or locale category had previously been loaded into memory 70 by setlocale 200. If the desired locale or locale category is presently in the queue 210, getlocale 260 obtains the locale category handles and places the locale category handles on the appropriate stacks in the stack set 220. The locale category handles on the stacks in the stack set 220 are then used to populate the appropriate locale categories 80. If the desired locale or locale category is not presently in memory 70, getlocale 260 will return control to the application program 195 which will advise the user that the desired locale or locale category is not presently found in memory 70. The user will either require that setlocale 200 load into memory 70 the locale or locale category or specify a different locale or locale category to be used to populate the locale categories by getlocale 260. The use of the getlocale 260 function avoids the large processing overhead associated with setlocale 200, particularly when it is necessary to repetitively activate and deactivate the same locale. The use of getlocale 260 results in a significant reduction in the processing overhead required for using internationalized applications to switch between different locales.

Figure 9:
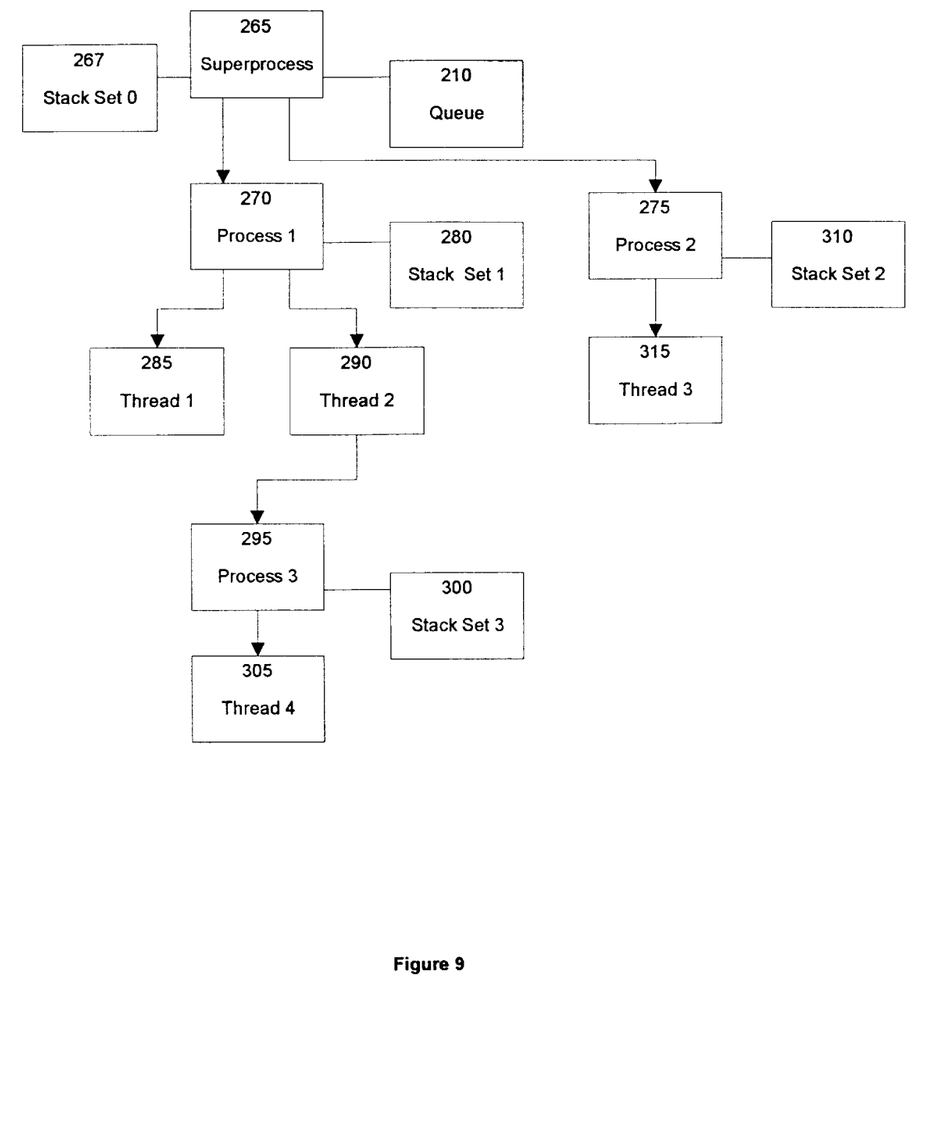
FIG. 9, in a block diagram, illustrates the relationship between a superprocess, the queue, processes, threads and stack sets in the non-global locale model as implemented in the preferred embodiment of the invention in FIG. 7.

FIG. 9 illustrates the relationship between the superprocess 265, the queue 210, stack sets, processes and threads. Superprocess 265 is assigned a stack set 0 (267). The queue 210 is maintained at the superprocess 265 level. Queue 210 may be shared by process 1 (270) and process 2 (275) since they run under the same superprocess. A queue may not be shared across superprocesses. The queue 210 is accessible by process 1 (270). Process 1 (270) is assigned a stack set 1 (280) which is accessible by threads 1 (285) and 2 (290) running under process 1 (270). Process 3 (295) runs under thread 2 (290) and is assigned a stack set 3 (300) which is accessible by thread 4 (305). The queue 210 is also accessible by process 2 (275) which is assigned stack set 2 (310). Thread 3 (315) runs under process 2 (275). Stack set 2 (310) is accessible by thread 3 (315). The CPU shares its processing time amongst process 1 (270), process 2 (275) and process 3 (295). When the CPU finishes processing one process and before processing the next process, it must load the locale categories with the locale category handles on the top of the stack set assigned to the next process. For example, when the CPU finishes processing process 1 (270) and commences processing process 2 (275), it loads the locale categories with values at the top of stack set 2 (310).

A change in the elements of the queue 210 is not reflected in the stack set at the process level and, thus, does not affect the threads running under the process.

It will be understood by those skilled in the art that application programs which have not been designed to use the getlocale or stack functions will operate on a computer whose operating system contains these functions. Numerous modifications, variations and adaptations may be made to the particular embodiment of the invention described above without departing from the scope of the invention which is defined in the claims.

The embodiments of the invention in which an exclusive property or privilege is claimed are defined as follows:

1. In an operating system, in a computer readable format, for configuring a computer to enable users to execute application programs on said computer; said application programs permitting the users to specify the cultural preference for formatting information to be presented by the users or for processing information provided to the users, said application program is executable as a number of processes, each of which may support one or more threads; said computer including working memory and a database of files, managed by said operating system, said files containing code for formatting said information according to said specified cultural preference; said operating system transferring one or more of said files, corresponding to said specified cultural preference, to said working memory; said operating system further setting environment control variables corresponding to categories of cultural preferences that may be specified, implementing a function call, and populating each of said memory locations corresponding to said categories of cultural preferences; said function call being accessible by each of said processes, wherein the improvement to the step of implementing said function call comprises:

assigning from said working memory, for each of said processes from which said function call is executed, one stack for each category of cultural preference that may be specified;

pushing onto each said assigned stack, the location in said working memory of said transferred file corresponding to the cultural preference specified for said category of cultural preference corresponding to said stack; and populating each of said memory locations corresponding to said categories of cultural preference of each said assigned stack, with said location in said working memory;

wherein on a subsequent function call, said application performs the steps of:

determining whether or not said location in said working memory of said transferred file, corresponding to the change in cultural preference specified, is on the stack previously assigned by a function call to the category of cultural preferences specified;

if so, invoking a function call that pops said previously assigned stack until said location in memory is on the top of said previously assigned stack; and if not, invoking a function call that pushes onto each said previously assigned stack, the location in said working memory of said transferred file for said category of cultural preference corresponding to said previously assigned stack.

2. The method as recited in claim 1, wherein said step of implementing said function call further includes:

assigning from said working memory, a queue; and loading on said queue, said location in said working memory of said transferred file, corresponding to the cultural preference specified for said category of cul tural preference, along with a corresponding cultural preference identifier.

3. The method as recited in claim 2, further comprising the step of implementing a second function call, wherein said step includes:

determining whether or not a cultural preference identifier is on said queue;

if so, retrieving from said queue said corresponding memory location and populates each of said memory locations corresponding to said categories of cultural preference; and if not, transferring to said working memory a file, corresponding to each category of cultural preference specified, and places in said queue the location in said working memory of said transferred file for said category of cultural preference.

* * * * *